UNITED STATES PATENT OFFICE.

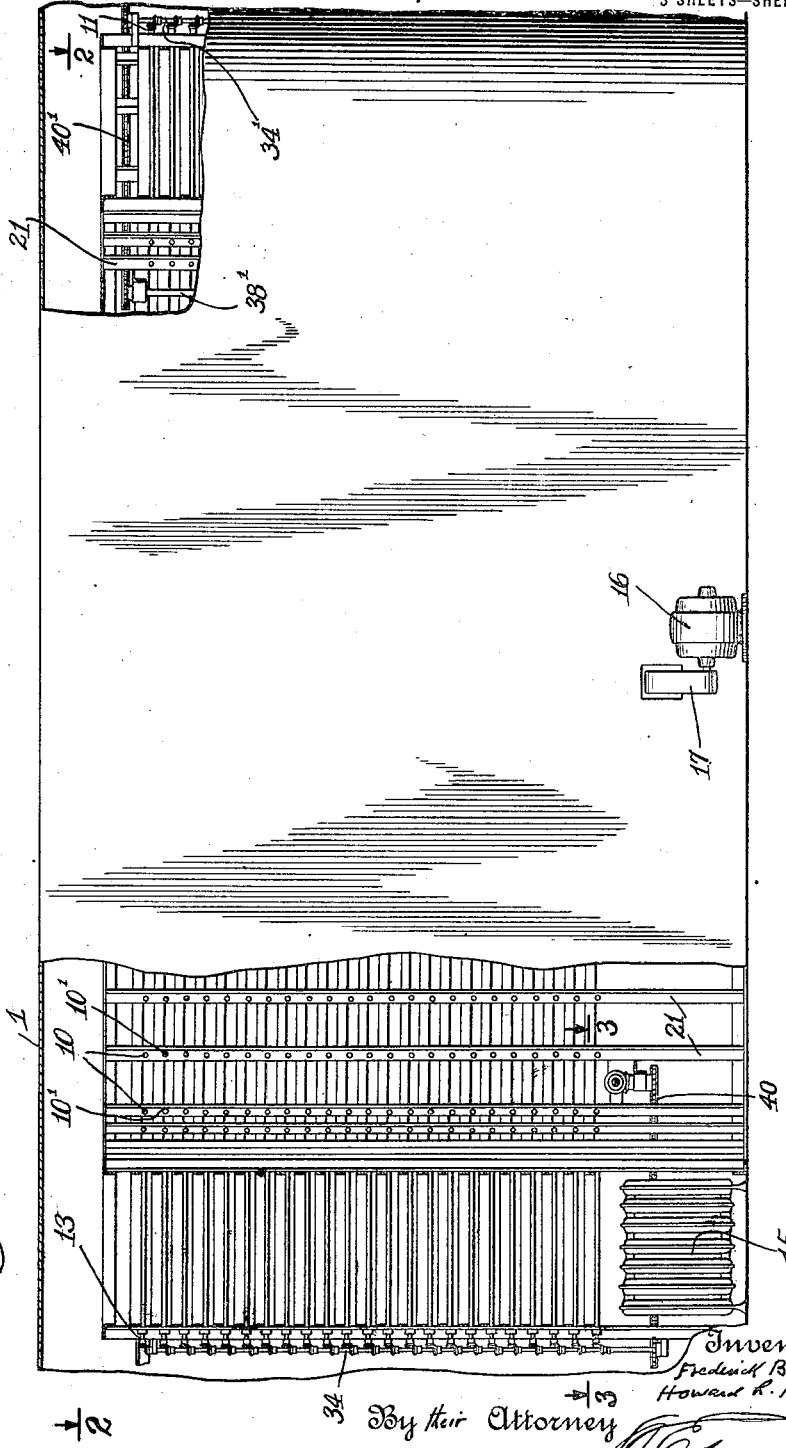

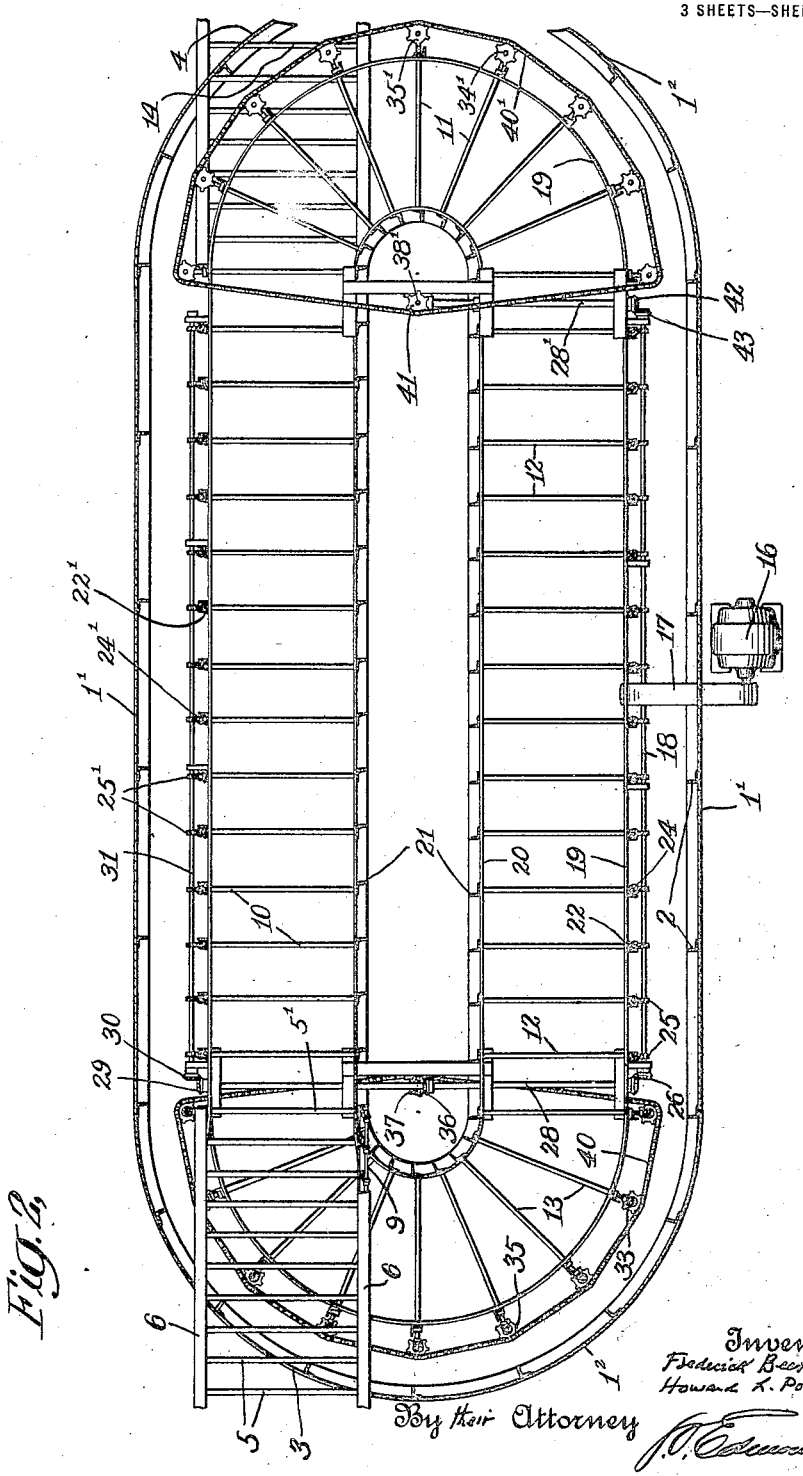

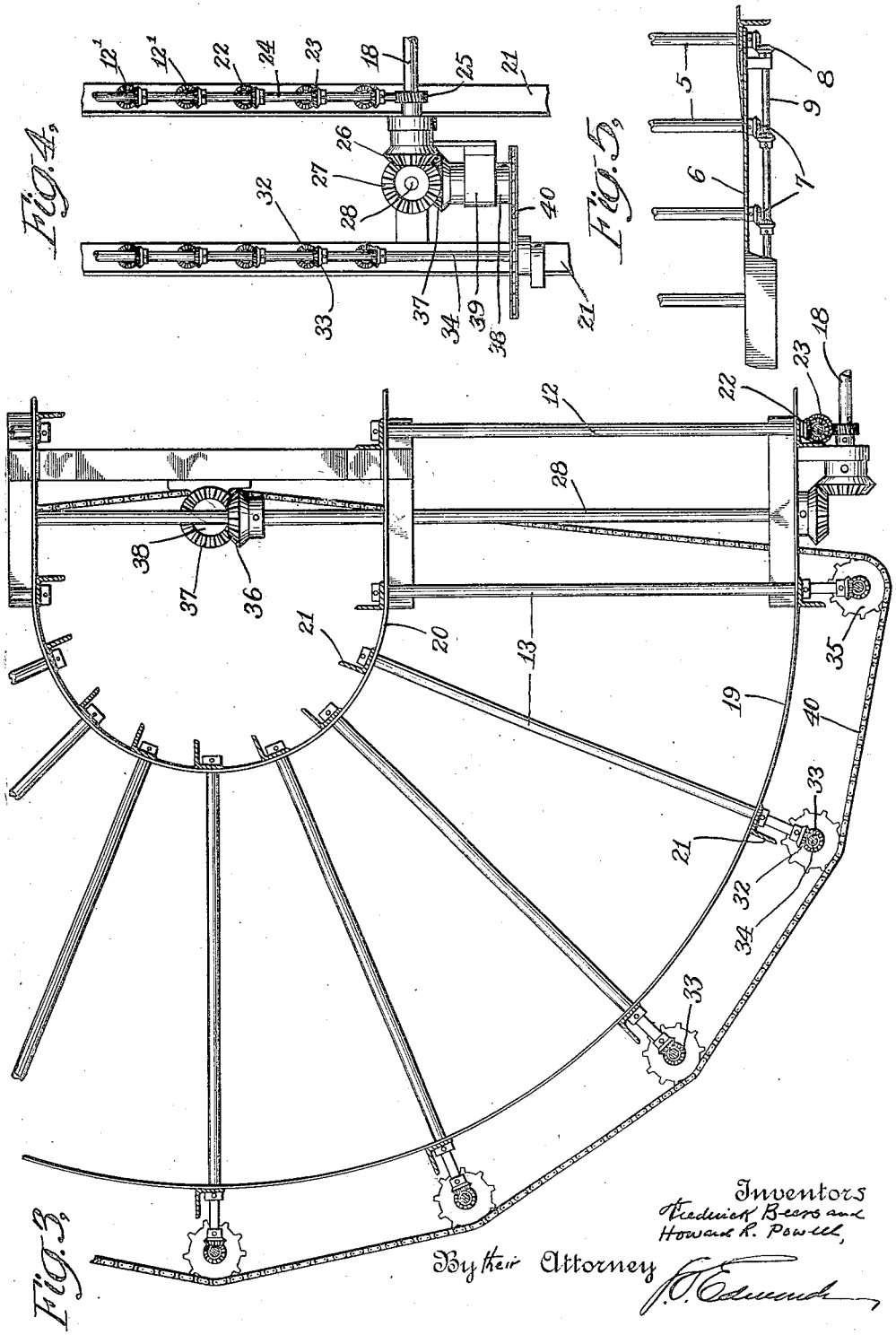

FREDERICK BEERS, OF NEW ROCHELLE, AND HOWARD L. POWELL, OF NEW YORK, N. Y., ASSIGNORS TO NATIONAL BISCUIT COMPANY, OF NEW YORK, N. Y., A CORPORATION OF NEW JERSEY.

DRIER OR OVEN.

1,422,817.  Specification of Letters Patent.  Patented July 18, 1922.

Application filed August 27, 1920. Serial No. 406,449.

*To all whom it may concern:*

Be it known that we, FREDERICK BEERS, a resident of New Rochelle, in the county of Westchester and State of New York, and HOWARD L. POWELL, a resident of the borough of Manhattan, in the city, county, and State of New York, both citizens of the United States, have invented certain new and useful Improvements in Driers or Ovens, of which the following is a specification.

Our invention relates to driers or ovens intended particularly for applying heat to food products which are progressed through the same. Our invention may be applied to a drier, to be used, for example, for drying small cakes or the like to which a coating of icing or chocolate or similar material has been applied. Or, our invention may be applied to a construction, essentially the same as the drier referred to, to be used for baking food products or other articles. We will refer to our construction broadly as an oven, regardless of whether the same be used for drying or baking or other heat-applying purposes.

Our invention is concerned particularly with improvements in mechanism for progressing the articles to which heat is to be applied through the oven or drier. In accordance with our invention rotating rollers are provided extending for a desired distance through the enclosing casing of the oven, these rollers all being rotated in a forward direction so that articles placed thereon will be progressed over the rollers by frictional contact therewith. Preferably, the rollers extend throughout a plurality of courses so as to occupy a considerable part of the enclosed space both in the horizontal and vertical directions, so that the articles progressed thereover will travel for a considerable time and through a path of considerable length while they are subjected to heat which is suitably supplied within the structure. Thus, the articles to be heated may enter the casing at a suitable opening, progress forwardly, thence travel through a curved path and proceed in an opposite direction, thence again travel through a curved path and again extend forwardly beneath the forwardly extending course, first mentioned, etc. In this manner the articles may be subjected to a continuously increasing heat or to a continuously decreasing heat, if desired.

The rollers are all rotated in the same direction, that is, in the direction suitable for advancing the articles continuously over the same, by suitable connections which preferably rotate all of the rollers at the same speeds. In the case of small articles of food, such as cakes, the same may be placed in pans or trays which are caused to pass over the rollers, suitable guiding means being provided at the ends of the rollers to keep the trays or other articles in position on the rollers. By means of the construction briefly described above, various defects or disadvantages of the devices previously used are overcome.

In order that a clearer understanding of our invention may be had attention is hereby directed to the accompanying drawings forming part of this application and illustrating one embodiment of our invention. In the drawings Fig. 1 represents a side elevation of a construction embodying our invention, the outer casing being partially broken away, Fig. 2 is a horizontal section taken on line 2—2 of Fig. 1, Fig. 3 is an enlarged partial plan view which may be considered as taken on line 3—3 of Fig. 1, Fig. 4 is an enlarged partial side elevation showing a detail of construction and Fig. 5 is an enlarged horizontal section showing a further detail of construction.

Referring to the drawings the oven is provided with an outer casing 1 which may form the vertical and also the horizontal outside surfaces of the oven, the oven preferably being formed with parallel side portions 1', 1', and curved end portions $1^2$, $1^2$. The casing may suitably be formed of sheet metal suitably reinforced as by vertical angles 2.

The articles to be heated enter the oven through a suitable entrance opening which may be at one level and leave the oven by a suitable exit opening which may be at a different level. In the construction shown in the drawings the entrance opening is understood to be adjacent the upper portion of one end of the structure, at 3, and the exit opening is understood to be adjacent the bottom portion of the opposite end of the casing, at 4.

Articles to be progressed through the oven, such as trays having wire bottoms on which cakes or the like are positioned, are progressed or fed through the entrance opening 3. They are preferably so progressed by the means illustrated in the drawings, comprising a series of parallel rollers 5, the opposite ends of which are rotatably mounted in frame members 6, 6. In the form of our invention illustrated all of the rollers 5 are provided at one end of each of the same with bevel gears 7 which mesh with bevel gears 8 on a shaft 9 which is rotatably mounted adjacent one of the longitudinal frame members 6. The series of rollers 5 may extend into the oven on a horizontal level or at a downward inclination or otherwise.

The articles which pass over rollers 5 progress on to rollers 10 which extend in parallel relation, in alignment with rollers 5, and preferably adjacent to one of the side walls 1' of the oven. At the end of the side wall portion of the oven rollers 11, similar to roller 10, are arranged in radial relation to extend around the curved end of the oven. After rollers 11 come rollers 12, similar to the others and extending rearwardly of the structure adjacent to the opposite side wall thereof. Radially disposed rollers 13 continue the series around the opposite curved end of the structure, and from the end of the radial rollers 13 extend a course of parallel rollers 10', above or below the rollers 10. As is shown in the drawings the series of rollers may then extend at a constant downward inclination throughout a considerable number of courses one above the other, the articles which have passed over all of these rollers being progressed out through the exit opening 4 by means of a series of parallel rollers 14, which may be in alignment with the end of the bottom course of rollers beneath rollers 10.

Heat for drying or otherwise affecting the articles carried over the series of rollers may be supplied from any desired source such for example, in the case of a drier, as the steam radiator indicated at 15.

Power for rotating the various rollers is supplied from a suitable source such as the motor 16 which is connected by a belt 17 with a horizontal shaft 18 which may be rotatably mounted adjacent the bottom of one of the side walls 1' of the oven. Guiding means for articles progressed over the rollers may be provided by vertical frame members 19, 20 which extend alongside the inner and outer ends of the rollers and provide bearing means in which the ends of the rollers are rotatably mounted. Frame members 19 and 20 may conveniently be formed of sheet metal re-enforced by vertical angles 21.

All of the rollers 12 as well as the rollers 12' below the same are provided on their outer ends with bevel gears 22. Bevel gears 22 mesh with bevel gears 23 on vertical shafts 24 of which there is one provided for each one of the rollers 12, the rollers of the courses beneath rollers 12 being vertically aligned therewith. The horizontal shaft 18 is rotatably connected with each of the vertical shafts 24, as by means of spiral gears 25 on shaft 18 meshing with suitable spiral gears at the lower ends of vertical shafts 24.

Shaft 18 is provided at its left hand end, referring to Fig. 2, with bevel gear 26 which meshes with a bevel gear 27 on a horizontal transverse shaft 28. This shaft 28 extends to the opposite side of the construction where it is provided with a bevel gear 29 meshing with a bevel gear 30 on a horizontal shaft 31. This latter is provided with spiral gears 25' which mesh with suitable spiral gears on vertical shafts 24', which latter are similar to the vertical shafts 24 and are provided with bevel gears which mesh with bevel gears 22' on the outer ends of the rollers 10 and the rollers of the various courses beneath the same.

The rollers 13, and all of the other radially directed rollers of the various courses, vertically aligned with the same, are provided at their outer ends with bevels 32 which mesh with bevels 33 on vertical shafts 34 which are arranged in a semi-circle around the curved end portion of the outer frame member 19. Shafts 34 are provided, adjacent their lower ends with sprocket wheels 35.

Shaft 28 is provided, at or adjacent to the vertical centre line of the construction, with a bevel gear 36 which meshes with a bevel gear 37 on the upper end of a short vertical shaft 38 which is suitably supported by means of a bracket 39. Shaft 38 is provided with a sprocket wheel at its lower end and a sprocket chain 40 engages the sprocket wheel on shaft 38 and all of the sprocket wheels 35 on shafts 34, so that all of the radially arranged rollers 13 and all of the rollers beneath the same are rotated in unison and in the same direction as rollers 12, etc.

The construction is similar at the opposite end of the oven. Vertical shafts 34' are arranged in a semi-circle around the curved end portion of the frame member 19 at this end of the structure, these shafts being provided with sprocket wheels 35'. A shaft 38' extends vertically adjacent the centre line of the oven, this shaft having a sprocket wheel 41 adjacent its upper end. A sprocket chain 40' extends about sprocket wheels 35' and 41. Shaft 38' is rotated by bevel gear connection with a transverse shaft 28', adjacent the bottom of the structure, his being connected by bevel gears 42 and 43 with the adjacent end of shaft 18. The various vertical shafts 34' are connected with the radially arranged rollers 11 and the radially arranged rollers beneath the same, by bevel gear connections similar to bevel gears 32 and 33 previously referred to.

The sprocket chain 40 is suitably arranged adjacent to the bottom of the structure and the sprocket chain 40' adjacent the top of the opposite end of the structure so as not to interfere with the passage of articles into and out of the entrance and exit openings 3 and 4.

As stated, the articles are preferably introduced into the oven by means of rotating rollers 5, which are rotated by bevel gear connections with shaft 9. The last one of the series of rollers 5, here designated as 5', is connected at its outer end by bevel gear connection with one of the shafts 34, all of which shafts are rotated by sprocket chain 40. Accordingly, all of the rollers 5 will be rotated in the same direction as rollers 10.

Similarly, the articles which have passed through the oven may be removed therefrom by a series of rollers 14 which extend out through the exit opening 4. These rollers 14 are connected together for rotation in the same manner as rollers 5, power being derived from one of the shafts 34', which is rotated by sprocket chain 40'.

It will be obvious from the above description that articles, such as trays containing food products, introduced into the oven will be progressed repeatedly through the same by frictional contact with the rotating rollers, which advance the articles from one roller to the next through a looped downwardly slanting path extending throughout a plurality of courses from the entrance to the exit opening.

It will be obvious that our invention is not limited to the details of construction described but is as broad as is indicated by the accompanying claims.

What we claim is:—

1. In an oven, the combination of an enclosing casing, and means for progressing articles therethrough in a looped, downwardly slanting path, comprising rollers arranged to extend across such path and means for rotating said rollers all in such direction that articles placed thereon will be carried forwardly over the same by frictional contact therewith, said last named means comprising a rotating shaft, vertical shafts rotated therefrom, and connections for rotating a plurality of said rollers from each vertical shaft.

2. In an oven, the combination of an enclosing casing, and means for progressing articles therethrough, comprising a series of rollers extending forwardly in parallel relation for a distance, then radially around a curve and then rearwardly in parallel relation, and means for rotating said rollers all in such direction that articles placed thereon will be carried along over the same by frictional contact therewith, said last named means comprising a rotating shaft, means for driving said forwardly extending rollers therefrom, a shaft adjacent to said rearwardly extending rollers, means for rotating said rearwardly extending rollers therefrom, a driving connection therefor extending from said first shaft, and means operatively connected to said first shaft for rotating said radially extending rollers.

3. In an oven, the combination of an enclosing casing, having entrance and exit openings at different levels, and means for progressing articles therethrough, comprising a succession of rollers extending through said casing in a plurality of courses at a vertical inclination from said entrance to said exit opening, and means for rotating said rollers all in such direction that articles placed thereon will be carried forwardly over the same by frictional contact therewith, said means comprising a rotating shaft, shafts adjacent to the various courses of rollers, connections for driving the rollers of each course from the adjacent shaft, and connections between said first named rotating shaft and said last named shafts.

4. In an oven, the combination of an enclosing casing, and means for progressing articles therethrough, comprising a series of rollers extending forwardly in parallel relation for a distance, then radially around a curve and then rearwardly in parallel relation, and means for rotating said rollers all in such direction that articles placed thereon will be carried along over the same by frictional contact therewith, said rotating means including sprocket wheels rotatably connected with said radially extending rollers, a sprocket chain extending about said sprocket wheels, and means for rotating said chain.

5. In an oven, the combination of an enclosing casing, and means for progressing articles therethrough in a looped, downwardly slanting path, comprising rollers arranged to extend across such path, said rollers being arranged in a plurality of courses with rollers of one course vertically aligned with rollers above and below the same, vertical shafts each rotatably connected with a vertical series of rollers, and means for rotating said vertical shafts all in such direction that articles placed on said rollers will be carried forwardly over the same by frictional contact therewith.

This specification signed and witnessed this 20th day of August, 1920.

FREDERICK BEERS.
HOWARD L. POWELL.

Witnesses:
G. M. SUNDHEIM,
L. D. KIDD.